United States Patent
Splett

(10) Patent No.: US 8,115,677 B2
(45) Date of Patent: Feb. 14, 2012

(54) TRANSMITTER AND RECEIVER-SIDE PROCESSING OF SIGNALS TRANSMITTED OR RECEIVED WITH A SMART ANTENNA

(75) Inventor: Armin Splett, Ulm (DE)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 905 days.

(21) Appl. No.: 11/884,277

(22) PCT Filed: Oct. 6, 2005

(86) PCT No.: PCT/EP2005/055058
§ 371 (c)(1),
(2), (4) Date: Jun. 23, 2008

(87) PCT Pub. No.: WO2006/084512
PCT Pub. Date: Aug. 17, 2006

(65) Prior Publication Data
US 2008/0316102 A1 Dec. 25, 2008

(30) Foreign Application Priority Data
Feb. 14, 2005 (EP) .................................. 05003115

(51) Int. Cl.
*H04B 7/00* (2006.01)
(52) U.S. Cl. ........................................ 342/367
(58) Field of Classification Search .................... 342/367
See application file for complete search history.

(56) References Cited

U.S. PATENT DOCUMENTS

| | | | | |
|---|---|---|---|---|
| 6,433,737 | B2 * | 8/2002 | Katz | 342/367 |
| 6,515,605 | B2 * | 2/2003 | Panasik et al. | 341/143 |
| 2003/0109226 | A1 | 6/2003 | Brunner et al. | |

FOREIGN PATENT DOCUMENTS

EP 1 229 669 8/2002

* cited by examiner

*Primary Examiner* — Thomas Tarcza
*Assistant Examiner* — Nga X Nguyen
(74) *Attorney, Agent, or Firm* — Staas & Halsey LLP

(57) ABSTRACT

For transmitter-side processing of information it is decided in which direction of transmission signals for a receiver are to be transmitted, the direction of transmission being a linear combination of one of a number of antenna directional diagrams corresponding to a first plurality. In a baseband processing section (REC), a number of antenna directional diagram signal sequences (X(1),X(2)), corresponding to the first plurality is determined from a signal sequence (T), determined for the receiver by weighting of the signal sequence (T) for each of the antenna directional diagrams with a coefficient (a(1), a(2)) corresponding to each of the linear combinations. Each antenna directional diagram signal sequence (X(1),X(2)) is transmitted by a dedicated logical connection from the baseband processing section (REC) to a high frequency processing section (RE). A conversion of the first plurality of antenna directional diagram signal sequences (X(1),X(2)) to a number of antenna element analogue signals, corresponding to a second plurality different to the first plurality, is carried out in the frequency processing section (RE). Each antenna element analogue signal is transmitted from one antenna element (A) of a number of antenna elements (A) corresponding to the second plurality.

10 Claims, 2 Drawing Sheets

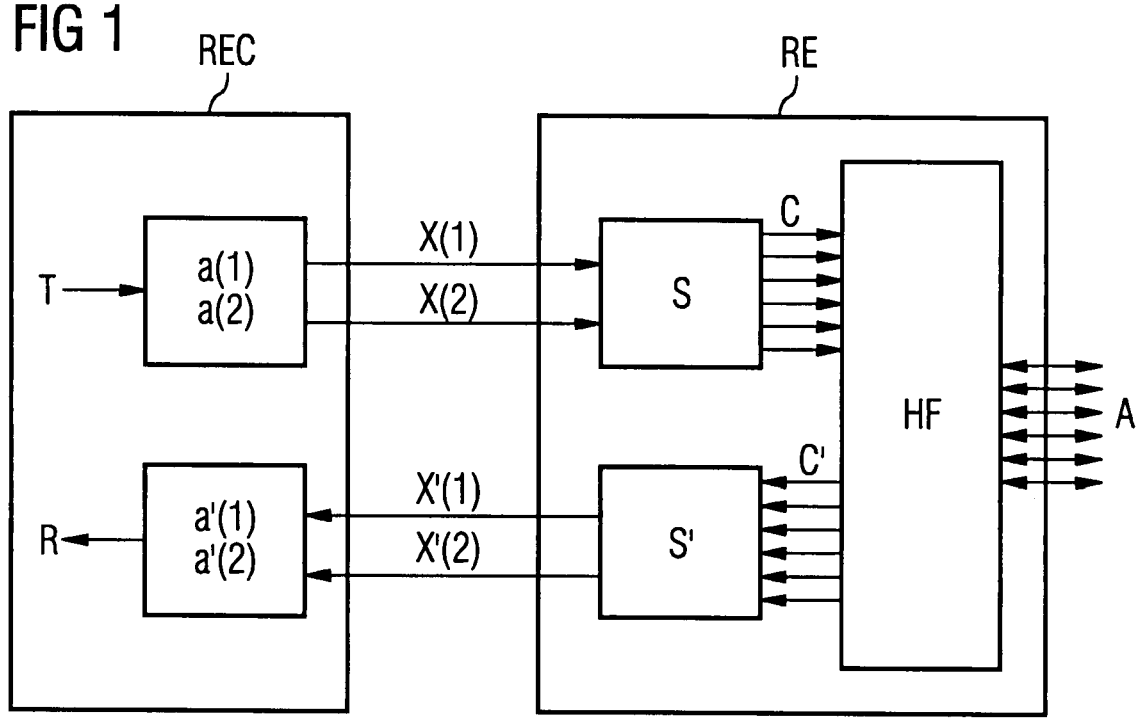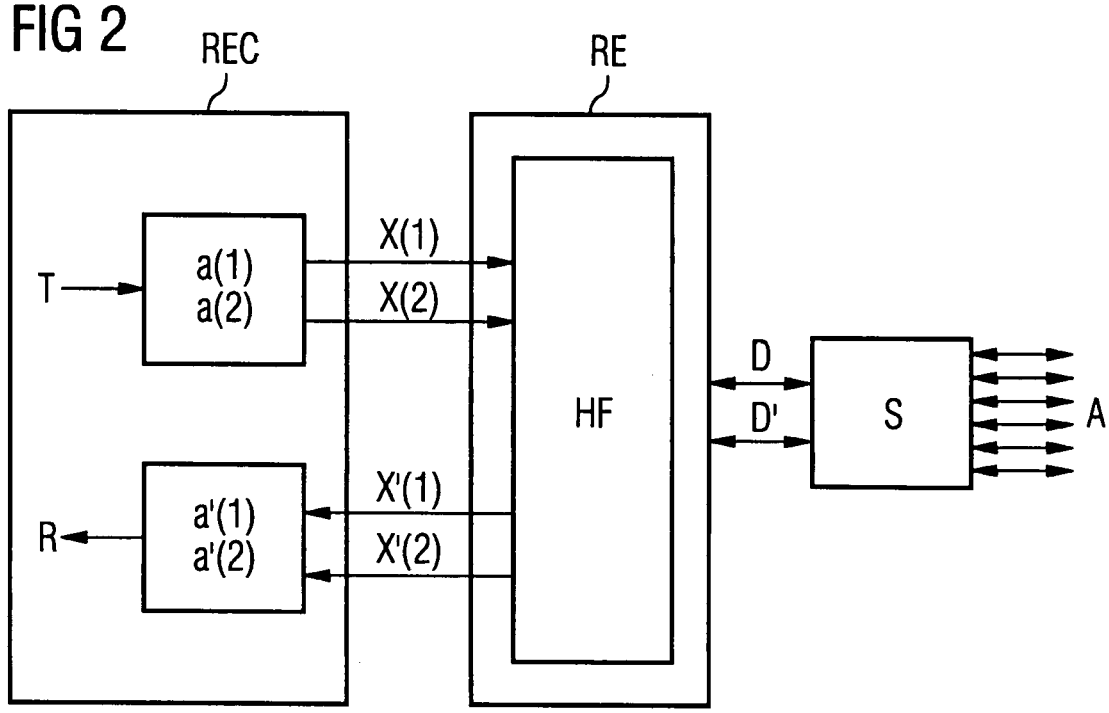

TRANSMITTER AND RECEIVER-SIDE PROCESSING OF SIGNALS TRANSMITTED OR RECEIVED WITH A SMART ANTENNA

CROSS REFERENCE TO RELATED APPLICATIONS

This application is based on and hereby claims priority to PCT Application No. PCT/EP2005/055058 filed Oct. 6, 2005 and European Application No. EP05003115 filed on Feb. 14, 2005, the contents of which are herby incorporated by reference.

BACKGROUND OF THE INVENTION

The invention relates to a method for the transmitter- and receiver-side processing of information, which is transmitted or received by way of a plurality of antenna elements. The invention also relates to devices for implementing the method.

In radio communication systems messages, for example containing voice information, image information, video information, SMS (Short Message Service), MMS (Multimedia Messaging Service) or other data, are transmitted with the aid of electromagnetic waves by way of a radio interface between the sending and receiving stations. Depending on the specific configuration of the radio communication system, the stations here can be different types of subscriber-side radio stations or network-side radio facilities, such as repeaters, radio access points or base stations. In a mobile radio communication system at least some of the subscriber-side radio stations are mobile radio stations. The electromagnetic waves are transmitted at carrier frequencies, which are within the frequency band provided for the respective system.

Mobile radio communication systems are often configured as cellular systems, for example according to the GSM (Global System for Mobile communication) or UMTS (Universal Mobile Telecommunications System) standard, with a network including example of base stations, facilities for monitoring and controlling the base stations and further network-side facilities. In addition to these cellular, hierarchical radio networks organized over long distances (supralocal), there are also wireless local networks (WLANs) with a generally spatially significantly more restricted radio coverage area. Examples of different standards for WLANs include Hiper-LAN, DECT, IEEE 802.11, Bluetooth and WATM.

Access by radio stations to the common transmission medium is regulated in radio communication systems by multiple access (MA) or multiplex methods. With such multiple access the transmission medium can be allocated among the radio stations in the time range (Time Division Multiple Access, TDMA), the frequency range (Frequency Division Multiple Access, FDMA), the code range (Code Division Multiple Access, CDMA) or the space range (Space Division Multiple Access, SDMA). Combinations of multiple access methods are also possible, such as for example the combination of a frequency division multiple access method with a code division multiple access method.

For efficient utilization of the scant radio resources available it is advantageous if radio stations, in particular network-side radio stations, use a plurality of antenna elements to send and/or receive messages. This allows the antenna beam to be deflected in the direction of the receiver(s) in the transmit direction, thereby reducing interference. In the receive direction the use of a plurality of antenna elements means that signals coming from a specific direction can be analyzed specifically and other signals can be masked out.

SUMMARY OF THE INVENTION

One possible object is to set out a method for the transmitter- and/or receiver-side processing of information, with which a plurality of antenna elements is used. Devices for implementing the method are also to be set out.

According to the method for the transmitter-side processing of information proposed be the inventor, it is decided in which transmission direction signals for a receiver are to be transmitted. The transmission direction is a linear combination of a number of antenna directional diagrams corresponding to a first plurality. In a baseband processing section a number of antenna directional diagram signal sequences corresponding to the first plurality is determined from a signal sequence intended for the receiver by weighting the signal sequence for each of the antenna directional diagrams with a coefficient corresponding to the linear combination in each instance. Each antenna directional diagram signal sequence is transmitted by way of a dedicated logical connection in each instance from the baseband processing section to a high frequency processing section. In the high frequency processing section the first plurality of antenna directional diagram signal sequences is converted to a number of antenna element analog signals, which corresponds to a second plurality and is different from the first plurality. Each antenna element analog signal is transmitted from one antenna element respectively of a number of antenna elements corresponding to the second plurality.

The method can be applied to a transmitter of a radio communication system, which has a plurality of antenna elements, preferably to a base station. An antenna element is a facility for transmitting and optionally also receiving radio waves. Each antenna element is connected by way of just one high-frequency connection to the further parts of the transmitter, by way of which the antenna element receives the analog signals to be transmitted and optionally forwards the received analog signals. An antenna element can include an arrangement of one or more transmitting elements, for example dipoles. Within an antenna element all the transmitting elements are supplied with the same analog signal, it being possible for amplitude and phase to be adjusted for example with mechanical phase modifiers, in order to be able to influence the transmission characteristic or antenna directional diagram of the antenna element. The overall transmission of the antenna including the number of antenna elements results from the overlaying of the transmission characteristics of the individual antenna elements. The transmission characteristic of the antenna is influenced, in order for example to achieve transmission in a specific direction or to suppress transmission in a specific direction to reduce interference. The same applies in the receive direction, in which the antenna directional diagram of the antenna consisting of a number of antenna elements can be influenced, in order to give preference to the reception of analog signals from a specific direction or to suppress interference signals from a specific direction.

Signals for a receiver are transmitted in a specific transmission direction. The decision relating to which transmission direction to use can be based in particular on knowledge about the location of the receiver, which is obtained from signals sent by the receiver. Transmission in the specific transmission direction is achieved in that the signals are transmitted by a second plurality of antenna elements. For the transmitter-side processing of information to be sent to the receiver, the specific transmission direction is represented as a linear combination of a first plurality of antenna directional diagrams. The transmission direction is therefore a specific antenna directional diagram, which is to be used for the transmission. Representation is preferably effected in such a manner that all or at least two of the linear combination coefficients of the individual antenna directional diagrams are not equal to zero.

There is a baseband processing section, which carries out at least some of the baseband processing, in other words the digital processing of information, and a high frequency processing section, which carries out at least the conversion of the digital information to the carrier frequency used for the transmission. In the baseband processing section a first plurality of signal sequences is generated, so that there is a specific signal sequence for each of the antenna directional diagrams of the linear combination. These are antenna directional diagram signal sequences in so far as there is just one signal sequence for each antenna directional diagram. The antenna directional diagram signal sequences are transmitted separately from each other, in each instance by way of a dedicated logical connection, to the high frequency processing section. Therefore at least as many logical connections are required between the baseband processing section and the high frequency processing section as the number of antenna diagrams used to represent the transmission direction.

A number of logical connections between the baseband processing section and the high frequency processing section can be transmitted by way of a common physical connection, for example by way of an optical fiber. There is therefore at least one physical connection between the baseband processing section and the high frequency processing section. The physical connection or physical connections can hereby enable for example an electrical or optical transmission method.

In the high frequency processing section the first plurality of antenna directional diagram signal sequences is converted to a second plurality of antenna element analog signals. The first and second pluralities hereby differ from each other. Conversion is in two parts: the signal sequences are converted to analog signals by conversion to the carrier frequency, in other words conversion takes place from digital to analog signals, and the number of information streams is changed from the first plurality to the second plurality. The second plurality hereby corresponds to the number of antenna elements used for signal transmission. After conversion there are antenna element analog signals present in so far as just one analog signal is present for transmission for each antenna element, in other words each antenna element analog signal is intended for just one antenna element, with no antenna element transmitting more than one of the antenna element analog signals.

In a development, conversion of the first plurality of antenna directional diagram signal sequences to the second plurality of antenna element analog signals takes place in that the first plurality of antenna directional diagram signal sequences is converted to a number of antenna element signal sequences corresponding to the second plurality. The second plurality of antenna element signal sequences is then converted to the second plurality of antenna element analog signals by conversion to a carrier frequency. According to this development the conversion to digital takes place first, in other words the number of signal sequences is converted from the first plurality to the second plurality. After this conversion to digital, antenna element signal sequences are present, since just one signal sequence is intended for transmission for each antenna element. The conversion from baseband to carrier frequency takes place as a second step, with the number of information streams remaining unchanged, in other words the second plurality of antenna element signal sequences is converted to the second plurality of antenna element analog signals. An antenna element signal sequence, which is intended for a specific antenna element, is converted by the second conversion step to an antenna element analog signal, which is intended for the same antenna element.

According to a further development, conversion of the first plurality of antenna directional diagram signal sequences to the second plurality of antenna element analog signals takes place in that the first plurality of antenna directional diagram signal sequences is converted to a number of antenna directional diagram analog signals corresponding to the first plurality by conversion to a carrier frequency. The first plurality of antenna directional diagram analog signals is then converted to the second plurality of antenna element analog signals. According to this development, the conversion from baseband to carrier frequency takes place first, with the number of information streams remaining unchanged. After this conversion there is therefore an analog signal present for each antenna directional diagram. The number of analog signals is then changed from the first plurality to the second plurality, so that the second plurality of antenna element analog signals is present instead of the first plurality of antenna directional diagram analog signals. Each analog signal of the antenna element analog signals is intended for just one antenna element for transmission purposes.

The method is preferably applied to a plurality of receivers. To this end the individual antenna directional diagram signal sequences of the different receivers are added together before transmission from the baseband processing section to the high frequency processing section, in other words all the antenna directional diagram signal sequences of the first antenna directional diagram are added together, all the antenna directional diagram signal sequences of the second antenna directional diagram are added together, etc. Further processing takes place in respect of these added antenna directional diagram signal sequences. A first receiver in particular can be an individual receiver here and a second receiver can be a group of receivers, in other words the first transmission can be a unicast transmission and the second transmission can be a multicast or broadcast transmission.

With the method for the receiver-side processing of information an antenna element signal sequence of a transmitter is received in each instance by a number of antenna elements corresponding to a second plurality. In a high frequency processing section the second plurality of antenna element analog signals is converted to a number of antenna directional diagram signal sequences, which corresponds to a first plurality and is different from the second plurality, each antenna directional diagram signal sequence being a signal sequence received by way of a specific antenna directional diagram. Each antenna directional diagram signal sequence is transmitted in each instance by way of a dedicated logical connection from the high frequency processing section to a baseband processing section. In the baseband processing section a signal sequence is formed from the antenna directional diagram signal sequences, for example as a linear combination of the antenna directional diagram signal sequences, in that each antenna directional diagram signal sequence is weighted with a coefficient.

The method for the receiver-side processing of information involves the counter steps to the method for the transmitter-side processing of information. The above statements relating to the transmitter-side steps can therefore be applied correspondingly to the receiver-side method. In particular it is advantageous if the transmitter-side and receiver-side methods are used in combination. According to a preferred embodiment weighting can take place with the same coefficients for transmitter-side and receiver-side processing.

It is particularly advantageous, if the second plurality is greater than the first plurality. This means that the number of logical connections between the baseband processing section and the high frequency processing section can be smaller than the number of antenna elements used for transmission and/or receiving.

Transmission between the baseband processing section and the high frequency processing section can preferably take place by way of a CPRI (Common Public Radio Interface) interface.

A first radio station proposed by the inventor has units for deciding in which transmission direction signals for a receiver should be transmitted, the transmission direction being a linear combination of a number of antenna directional diagrams corresponding to a first plurality. The radio station also comprises a baseband processing section with units for determining a number of antenna directional diagram signal sequences corresponding to the first plurality from a signal sequence intended for the receiver by weighting the signal sequence for each of the antenna directional diagrams in each instance with a coefficient corresponding to the linear combination. A number of logical connections corresponding to the first plurality is present between the baseband processing section and a high frequency processing section, in each instance for transmitting one of the antenna directional diagram signal sequences from the baseband processing section to the high frequency processing section. The radio station also has units in the high frequency processing section for converting the first plurality of antenna directional diagram signal sequences to a number of antenna element analog signals, which corresponds to a second plurality and is different from the first plurality. Finally the radio station comprises a number of antenna elements corresponding to the second plurality for transmitting an antenna element analog signal in each instance.

The second proposed radio station has a number of antenna elements corresponding to a second plurality to receive an analog signal of a transmitter in each instance, as well as a high frequency processing section with a converter to convert the second plurality of antenna element analog signals to a number of antenna directional diagram signal sequences, which corresponds to a first plurality and is different from the second plurality, each antenna directional diagram signal sequence being a signal sequence received by way of a specific antenna directional diagram. The radio station also comprises a number of logical connections corresponding to the first plurality between a baseband processing section and the high frequency processing section, in each instance for transmitting one of the antenna directional diagram signal sequences from the high frequency processing section to the baseband processing section. Finally in the baseband processing section a forming unit forms a signal sequence from the antenna directional diagram signal sequences, for example as a linear combination of the antenna directional diagram signal sequences, in that each antenna directional diagram signal sequence is weighted with a coefficient.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 1 shows a schematic diagram of a first structure of a base station,

FIG. 2 shows a schematic diagram of a second structure of a base station,

DETAILED DESCRIPTION OF THE PREFFERED EMBODIMENT

Figure 3:
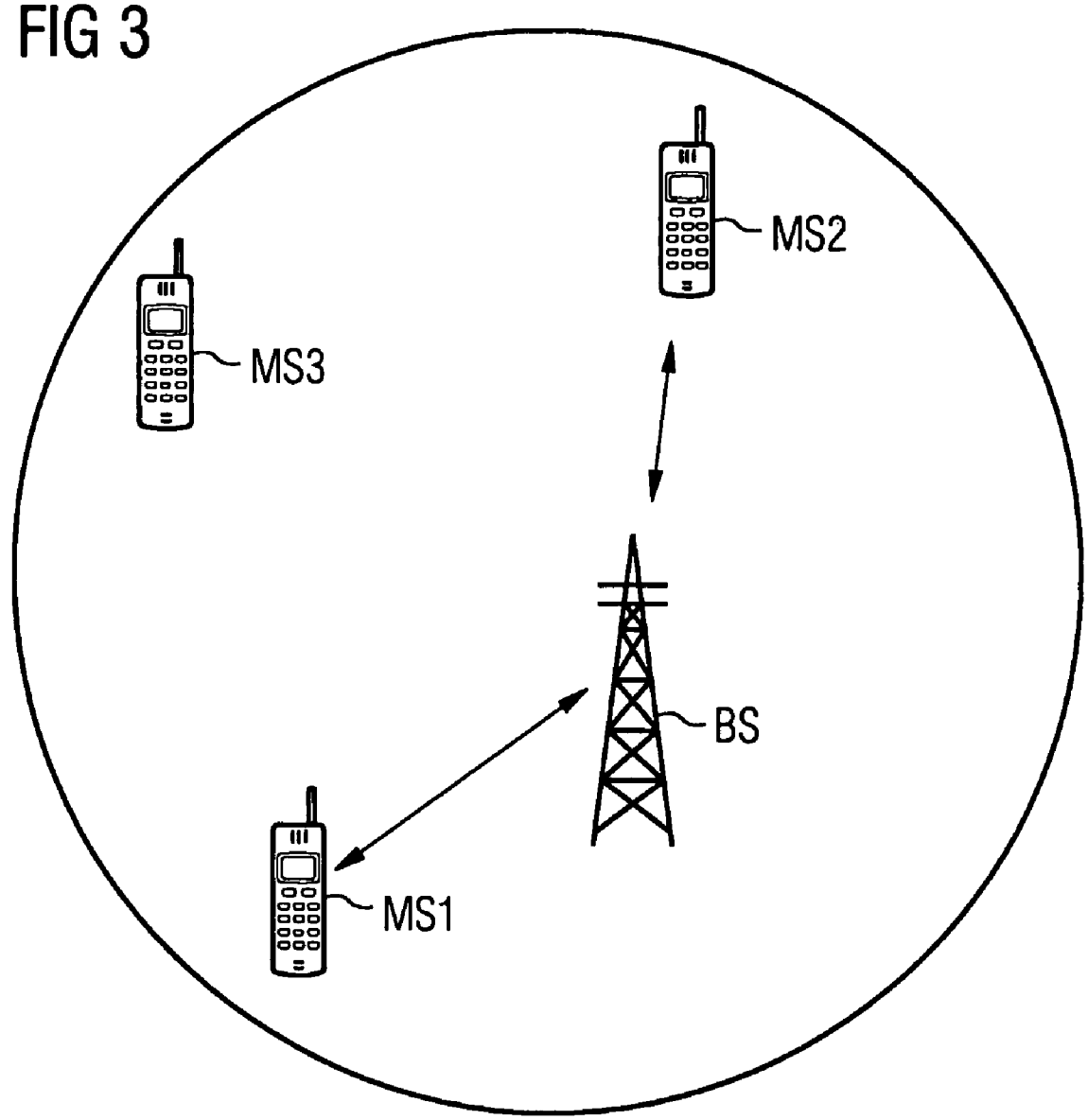
FIG. 3 shows a section from a radio communication system.

FIG. 1 shows a schematic diagram of the structure of a base station of a radio communication system, for example according to the UMTS standard. The base station has a plurality of antenna elements A. An antenna element is a facility for transmitting and receiving radio beams, having just one high-frequency connection for receiving analog signals to be transmitted by radio and for transmitting analog signals received by radio. An antenna element can hereby be made up of a number of physical emitters/receivers.

The use of intelligent antennas, including a plurality of antenna elements, allows the capacity of radio communication systems to be increased. In the context of CDMA or OFDMA (Orthogonal Frequency Division Multiple Access) a base station must calculate the phase and amplitude of the analog signal to be transmitted by each antenna element for every receiver subscriber station. Each antenna element is connected by way of a high-frequency cable to the remainder of the base station. In order to reduce the length of the high-frequency cable required overall for this purpose, the base station is divided into the two components REC (Radio Equipment Controller) and RE (Radio Equipment) for example according to the standard CPRI (Common Public Radio Interface, described for example in CPRI Specification V1.3 (2004-10-01), Common Public Radio Interface (CPRI); Interface Specification).

The base station in FIG. 1 is divided into the two components REC and RE. The component REC is responsible for the baseband processing of information to be sent and received. Digital signals are transmitted according to the CPRI standard, for example by way of optical fibers, between the component REC and the component RE. In the component RE the digital signals are converted in the module HF into analog signals of the carrier frequency used in the radio communication system for communication purposes. There are six antenna elements A, by way of which the analog signals are transmitted or by which the analog signals sent by the subscriber stations are received. Each of the antenna elements A is connected to the module HF by way of a high-frequency cable, symbolized by six double arrows between the antenna elements A and the module HF.

A signal sequence T is present for a subscriber station in the transmit direction, as shown in the upper part of FIG. 1. In the case of UMTS for example the signal sequence T is the complex baseband signal after spreading and scrambling. Two discrete antenna directional diagrams are established. It is assumed for the purposes of simplification below that the antenna directional diagram represents a specific transmit direction. For each of the two transmit directions there is a logical connection between the component REC and the component RE. For the first direction the digital signal sequence X(1) is transmitted from the component REC to the component RE, for the second direction the digital signal sequence X(2). The signal sequences X(1) and X(2) are calculated by multiplying the signal sequence T by a coefficient a(1) for the first transmit direction and a(2) for the second transmit direction: $X(j)=T \cdot a(j)$, where j is the index of the discrete transmit directions and can assume the values 1 and 2.

The coefficients a(1) and a(2) are generally complex numbers. The values for a(1) and a(2) are preferably not equal to zero. If the value a(1) is equal to zero and the value a(2) is not equal to zero, the signal for the subscriber station would be transmitted in the second transmit direction. If however the value a(2) is equal to zero and the value a(1) is not equal to zero, the signal for the subscriber station would be transmitted in the first transmit direction. If the two values a(1) and a(2) are not equal to zero, signal transmission takes place in a direction between the first and second transmit directions. Using the two coefficients a(1) and a(2) allows a linear combination of two discrete transmit directions. This allows the base station to tailor the transmission of the radio signals to the position of the subscriber station. The transmission of subscriber-specific signals in the direction of the current position of a subscriber station increases capacity, in other words the number of subscribers able to communicate for a given bandwidth per surface, since interference between the signals of different subscribers is reduced.

The signal sequences weighted with the coefficients a(1) and a(2) are transmitted in the form of the signal sequences X(1) and X(2) from the component REC to the component RE. To this end at least one line is used respectively in the transmit direction, according to the upper part of FIG. 1, and in the receive direction, according to the lower part of FIG. 1, with transmission taking place according to the CPRI standard. A dedicated logical connection between the component REC and the component RE is used in each instance for the signal sequences X(1) and X(2). The two logical connections can run by way of a common physical line but it is also possible for there to be a dedicated line for each logical connection.

In the component RE six signal sequences C are generated from the two signal sequences X(1) and X(2), corresponding to the six antenna elements, which are used to transmit the signal. The coupling matrix S is used for this purpose: $C(d) = S(d,j) \cdot X(j)$, where j is the index of the transmit directions and can assume the values 1 and 2 and d is the index of the antenna elements and can assume the values 1 to 6. The formula hereby relates in each instance to a time, in other words the 2-vector X includes the signal of the signal sequences X(1) and X(2) received at one time from the component RE. The 6×2 matrix S thus brings about the conversion of the 2-vector X with the inputs X(1) and X(2) to the 6-vector C with the inputs C(1), C(2), C(3), C(4), C(5) and C(6).

The signal sequences C(d) are subjected in the component HF to a channel filtering, with UMTS for example by a root-raised-cosine filter, conversion to the high-frequency position of the carrier frequency and a power amplification. The resulting analog signals are transmitted by way of the six antenna elements. This means that the signal sequence C(1) is converted to an analog signal for the first antenna element, the signal sequence C(2) to an analog signal for the second antenna element, etc. There is therefore a unique assignment between a signal sequence output by the matrix S and an antenna element respectively.

The counter steps take place in the receive direction. In the component HF the analog signals received by way of the six antenna elements are converted to six signal sequences C'. The matrix S', which is the transposed matrix S, converts the signal sequences C' to the two signal sequences X'(1) and X'(2), which are transmitted from the component RE to the component REC according to the CPRI standard.

Multiplying the vector X' by the vector a', which includes the inputs a'(1) and a'(2), gives the signal sequence R of the received signal. R is therefore a linear combination of X'(1) and X'(2), where $R = a'(1) \cdot X'(1) + a'(2) \cdot X'(2)$. The values a'(1) and a'(2) can be obtained by channel estimation, for example with the aid of training sequences. The values a(1) and a(2) for the transmit direction can be obtained for example from a(1)=a'(1) and a(2)=a'(2). As an alternative to forming a linear combination of X'(1) and X'(2) the signal sequence R can also be formed by a different combination of the signal sequences X'(1) and X'(2), for example using a joint detection or maximum ratio combining method.

The receiver-side method is preferably carried out first using a training sequence. This allows the coefficients a'(1) and a'(2) to be determined, which as the signal sequence R result best in the training sequence known on the receiver side. The values a'(1) and a'(2) thus determined therefore indicate the position of the subscriber station and can then be used to process received signals not known by the base station and to process information to be transmitted by the base station.

FIG. 1 shows the instance where the conversion of the two signal sequences X(1) and X(2) by the matrix S to the six signal sequences C(1), C(2), C(3), C(4), C(5) and C(6) takes place in the baseband. Alternatively conversion of two analog signals to six analog signals, as shown in FIG. 2, can take place in the high-frequency range. In contrast to FIG. 1, the two signal sequences X(1) and X(2) in the component RE are converted to two analog signals D(1) and D(2) in the component HF. Each of the two analog signals relates to one of the two transmit directions. The two analog signals D(1) and D(2) are converted by a Butler matrix S to six analog signals for the six antenna elements A. The corresponding statements also apply to the receive path, as shown in the lower part of FIG. 2.

Signals are transmitted in a specific transmission direction, while transmission in certain other directions is suppressed. The antenna beam can swing both vertically and horizontally, corresponding to a vertical tilt and/or a horizontal tilt. The main lobe of the antenna including the different antenna elements can also in principle be swung in any spatial direction. As far as the degree of freedom when generating the antenna directional diagram for the overall antenna is concerned, the number of antenna elements, their spatial arrangement and the antenna directional diagrams of the antenna elements are decisive factors.

FIG. 3 shows a region around the base station BS, symbolized by a circle, in which the subscriber stations MS1, MS2 and MS3 are located. The two transmit directions corresponding to the transmit directions of the signal sequences X(1) and X(2) in FIGS. 1 and 2 are shown by double arrows. The subscriber station MS1 is therefore located in the first transmit direction, the subscriber station MS2 in the second transmit direction and the subscriber station MS3 between the two transmit directions. The values a(1) and a(2) are therefore determined as:
Subscriber station MS1: a(1)=1, a(2)=0,
Subscriber station MS2: a(1)=0, a(2)=1,
Subscriber station MS3: a(1)=0.5, a(2)=0.5.

The matrix S can be constructed as follows for example with six antenna elements for the constellation in FIG. 3:

$$S = \begin{bmatrix} 1 & 1 \\ e^{-0.1 \cdot j} & e^{0.1 \cdot j} \\ e^{-0.2 \cdot j} & e^{0.2 \cdot j} \\ e^{0.2 \cdot j} & e^{-0.2 \cdot j} \\ e^{0.1 \cdot j} & e^{-0.1 \cdot j} \\ 1 & 1 \end{bmatrix}$$

For the first transmit direction (in other words for a(1)=1 and a(2)=0) the matrix S generates an antenna beam, having a main lobe down to the left. The subscriber station MS1 can therefore be in a village in a valley. Transmission in the first transmit direction is achieved by displacing the phases of the individual antenna elements in relation to each other according to the first column of the matrix S.

In contrast for the second transmit direction (in other words for a(1)=0 and a(2)=1) the matrix S generates an antenna beam, having a main lobe up to the right, for example in the direction of a mountain top. Transmission in the second transmission direction is achieved by displacing the phases of the individual antenna elements in relation to each other according to the second column of the matrix S. The subscriber station MS3, for whose signal transmission both the first and second columns of the matrix S are responsible, can for example be located on a path between the village in the valley and the top of the mountain.

If only the two transmit directions shown with double arrows is used, network coverage for the region between the locations of the subscriber station MS1 and subscriber station MS2 is optimized, where the subscriber station MS3 is located. The remaining area of the radio cell of the base station BS has no radio coverage. This is advantageous for example, if this is an inaccessible region where no subscriber stations are anticipated or a region where no interference is to be generated. With a sufficiently large number of antenna elements in a suitable spatial arrangement, for example at a distance of half the wavelength of the high-frequency signals used, regions of reduced radio coverage and regions of improved radio coverage can be defined in very finely granular spatial directions.

A number of discrete antenna directional diagrams is therefore used, which is smaller than the number of antenna elements. In the exemplary embodiment described two antenna directional diagrams or transmit directions are used, while six antenna elements are present. The method can however be applied to any other numbers of antenna directional diagrams and antenna elements. The transmission direction in which signals for the respective subscriber station are to be transmitted is determined for each subscriber station, it being possible to use only linear combinations of the discrete antenna directional diagrams as the transmission directions. For each of the antenna directional diagrams a signal sequence is created, which is a signal sequence intended for the subscriber station weighted by a factor a, and sent to the component of the base station, which is responsible for processing signals in the high-frequency range. To this end the number of logical connections corresponds to the number of antenna directional diagrams. Conversion from the number of antenna directional diagrams to the larger number of antenna elements takes place in the high-frequency section. If the conversion takes place in the baseband, a matrix is used for the purpose, with each column of the matrix corresponding to transmission in just one of the antenna directional diagrams. Alternatively the conversion can be effected in the high-frequency range.

Inclusion of the discrete number of antenna directional diagrams, the number of which is smaller than the number of antenna elements, has the advantage that the required length of the lines required within the base station for signal transmission is reduced. This is even more significant, the greater the distance between the unit for baseband processing, the component REC in FIGS. 1 and 2, and the unit for high frequency processing, the component RE in FIGS. 1 and 2.

Generally the base station sends signals to a number of subscriber stations or receives signals from a number of subscriber stations. In this instance the signal sequences X(1) and X(2) are the sums of the signal sequences of the different subscriber stations. In other words subscriber-specific signal sequences X(1) and X(2) are first determined, which are then summed before transmission from the component REC to the component RE. The signal sequences of the common channels, for example the broadcast channel, are also added to the subscriber signal sequences. Correspondingly in the receive direction the signal sequences X'(1) and X'(2) are generally an overlaying of the information received from different subscriber stations.

Computation outlay in the base station is reduced by the application of the method. For only the signals for the individual antenna directional diagrams, not for all the antenna elements, have to be determined in the component REC for a subscriber. Conversion from the number of antenna directional diagrams to the number of antenna elements takes place after the signals of the different subscriber stations have been summed. This means that signals for the different antenna elements do not have to be determined for each subscriber signal but for the sum of the subscriber signals. The resulting computation capacity saving is even greater, the greater the difference between the number of antenna elements and the number of antenna directional diagrams.

The antenna directional diagrams can, as shown in FIG. 3, represent the direction of the main lobe of the overall antenna device including the plurality of antenna elements. In general a transmit direction can correspond to a wide range of configurations of main and side lobes.

While the invention was described with reference to the standard for signal transmission within a base station CPRI, the invention can be applied independently of the CPRI standard.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in Superguide v. DIRECTV, 69 USPQ2d 1865 (Fed. Cir. 2004).

The invention claimed is:

1. A method for processing information at a transmitter from which signals are transmitted in a transmission direction determined from a linear combination of a first plural number of antenna directional diagrams, the method comprising:
    determining in a baseband processing section, an antenna directional diagram signal sequence for each antenna directional diagram, the antenna directional diagram signal sequences being determined from a signal sequence intended for a receiver by separately weighting the signal sequence for each of the antenna directional diagrams using a coefficient corresponding to the linear combination;
    transmitting each antenna directional diagram signal sequence using a separate dedicated logical connection from the baseband processing section to a high frequency processing section;
    converting the antenna directional diagram signal sequences in the high frequency processing section to produce a second plural number of antenna element analog signals, the second plural number being different from the first plural number; and
    separately transmitting each antenna element analog signal from a corresponding respective antenna element.

2. The method as claimed in claim 1, wherein
    the first plural number of antenna directional diagram signal sequences is converted to a number of antenna element signal sequences equal to the second plural number, and the antenna element signal sequences are converted to the second plural number of antenna element analog signals by conversion to a carrier frequency.

3. The method as claimed in claim 1, wherein
the first plural number of antenna directional diagram signal sequences is converted to a number of antenna directional diagram analog signals equal to the first plural number by conversion to a carrier frequency, and
the first plural number of antenna directional diagram analog signals is converted to the second plural number of antenna element analog signals.

4. The method as claimed in claim 1, wherein
the signals are transmitted to a plurality of receivers,
the transmission direction to each receiver is determined from a linear combination of a number of antenna directional diagrams equal to the first plural number,
for each receiver, the baseband processing section determines the first plural number of antenna directional diagram signal sequences from a signal sequence intended for the respective receiver by weighting the signal sequence for each of the antenna directional diagrams with a respective coefficient corresponding to the linear combination,
for each receiver, the antenna directional diagram signal sequences of the receivers are added together for each of the first plural number of antenna directional diagrams,
for each receiver, each added antenna directional diagram signal sequence is transmitted by way of a dedicated logical connection in each instance from the baseband processing section to the high frequency processing section,
for each receiver, in the high frequency processing section the first plural number of added antenna directional diagram signal sequences is converted to a number of antenna element analog signals equal to the second plural number, and
for each receiver, each antenna element analog signal is transmitted from one respective antenna element of a number of antenna elements equal to the second plural number.

5. The method as claimed in claim 1, wherein
a signal sequence is formed at a baseband processing section of the receiver from antenna directional diagram signal sequences obtained in the receiver from the antenna element analog signals received from the transmitter,
the signal sequence is formed in the receiver as a linear combination of the antenna directional diagram signal sequences by weighting each antenna directional diagram signal sequence with a respective coefficient, and
the same coefficients are used for processing at transmitter and the receiver.

6. The method as claimed in claim 2, wherein
a signal sequence is formed at a baseband processing section of the receiver from antenna directional diagram signal sequences obtained in the receiver from the antenna element analog signals received from the transmitter,
the signal sequence is formed in the receiver as a linear combination of the antenna directional diagram signal sequences by weighting each antenna directional diagram signal sequence with a respective coefficient, and
the same coefficients are used for processing at transmitter and the receiver.

7. The method as claimed in claim 3, wherein
a signal sequence is formed at a baseband processing section of the receiver from antenna directional diagram signal sequences obtained in the receiver from the antenna element analog signals received from the transmitter,
the signal sequence is formed in the receiver as a linear combination of the antenna directional diagram signal sequences by weighting each antenna directional diagram signal sequence with a respective coefficient, and
the same coefficients are used for processing at transmitter and the receiver.

8. The method as claimed in claim 1, wherein the second plural number is greater than the first plural number.

9. The method as claimed in claim 1, wherein transmission between the baseband processing section and the high frequency processing section takes place by way of a CPRI interface.

10. A radio station, comprising:
a determination unit to determine a transmission direction for signals to be sent to a receiver, the transmission direction being determined from a linear combination of a first plural number of antenna directional diagrams;
a baseband processing section to determine a number of antenna directional diagram signal sequences equal to the first plural number, the antenna directional diagram signal sequences being determined from a signal sequence intended for the receiver by separately weighting the signal sequence for each of the antenna directional diagrams using a coefficient corresponding to the linear combination;
a high frequency processing section to convert the antenna directional diagram signal sequences to a second plural number of antenna element analog signals, the second plural number being different from the first plural number;
a number of logical connections equal to the first plural number, the logical connections being between the baseband processing section and the high frequency processing section, each logical connection transmitting one of the antenna directional diagram signal sequences from the baseband processing section to the high frequency processing section; and
a number of antenna elements equal to the second plural number, the antenna elements each transmitting an antenna element analog signal.

* * * * *